US008642130B2

United States Patent
DeMassa

(10) Patent No.: US 8,642,130 B2
(45) Date of Patent: Feb. 4, 2014

(54) TOPICAL POLYURETHANE FOAM OXIDATIVE AND PHOTOOXIDATIVE STABILIZER

(75) Inventor: John M. DeMassa, Trumbull, CT (US)

(73) Assignee: Vanderbilt Chemicals, LLC, Norwalk, CT (US)

( * ) Notice: Subject to any disclaimer, the term of this patent is extended or adjusted under 35 U.S.C. 154(b) by 97 days.

(21) Appl. No.: 12/483,898

(22) Filed: Jun. 12, 2009

(65) Prior Publication Data

US 2009/0252867 A1    Oct. 8, 2009

Related U.S. Application Data

(62) Division of application No. 11/379,259, filed on Apr. 19, 2006, now abandoned.

(60) Provisional application No. 60/672,611, filed on Apr. 19, 2005.

(51) Int. Cl.
    *B05D 1/02*      (2006.01)

(52) U.S. Cl.
    USPC ........................................ 427/421.1; 427/160

(58) Field of Classification Search
    USPC .............................................. 427/421.1, 160
    See application file for complete search history.

(56) References Cited

U.S. PATENT DOCUMENTS

| | | | |
|---|---|---|---|
| 3,214,778 A | 11/1965 | Mathison | |
| 3,413,227 A | 11/1968 | Howard et al. | |
| 4,501,852 A * | 2/1985 | Markusch et al. | 524/591 |
| 4,578,406 A | 3/1986 | Volz | |
| 4,975,272 A | 12/1990 | Voyt | |
| 5,026,624 A | 6/1991 | Day et al. | |
| 5,081,258 A | 1/1992 | Kawaguchi | |
| 5,372,805 A | 12/1994 | Finkel et al. | |
| 5,558,700 A | 9/1996 | Shibahashi et al. | |
| 5,688,592 A * | 11/1997 | Shibahashi et al. | 428/323 |
| 5,695,689 A * | 12/1997 | Gupta et al. | 252/403 |
| 5,773,091 A * | 6/1998 | Perlman et al. | 427/384 |
| 6,033,736 A * | 3/2000 | Perlman et al. | 427/384 |
| 6,391,065 B1 | 5/2002 | Cooke | |
| 6,441,799 B2 * | 8/2002 | Spaulding | 343/872 |
| 6,992,138 B2 | 1/2006 | Tsuji et al. | |
| 2003/0082221 A1 | 5/2003 | O'Halloran | |
| 2004/0078998 A1 * | 4/2004 | Davis et al. | 36/44 |
| 2004/0170670 A1 | 9/2004 | Smith et al. | |

FOREIGN PATENT DOCUMENTS

WO    WO 02098944 A1 * 12/2002

* cited by examiner

*Primary Examiner* — Alexander Weddle

(74) *Attorney, Agent, or Firm* — Norris McLaughlin & Marcus P.A.

(57) ABSTRACT

Methods for inhibiting oxidation and photooxidation in polyurethane foams are disclosed. The method involves spraying onto the surface of a polyurethane foam one of the following compositions: a solvent-based composition comprising: an organic solvent; an ultraviolet (UV) light inhibiting compound; and an antioxidant; or an emulsion comprising: water; an emulsifier; an ultraviolet (UV) light inhibiting compound; and an antioxidant.

8 Claims, 7 Drawing Sheets

TOPICAL POLYURETHANE FOAM OXIDATIVE AND PHOTOOXIDATIVE STABILIZER

CROSS-REFERENCE TO RELATED APPLICATIONS

This application is a division of U.S. patent application Ser. No. 11/379,259, filed 19 Apr. 2006, now abandoned, and claims the priority benefit of provisional application U.S. Ser. No. 60/672,611, filed 19 Apr. 2005. The entire disclosure of the above applications is incorporated by reference.

FIELD OF THE INVENTION

The present invention relates to compositions that provide oxidative and photooxidative stability to polyurethane foams.

BACKGROUND OF THE INVENTION

Nearly all polymeric materials undergo oxidation reactions with oxygen. These reactions can occur with or without the assistance of ultraviolet light. In polyurethane foams, it is known that the foam suffers from the problem of discoloration arising from oxidation reactions and NOx fumes commonly formed in warehouses heated by natural gas combustion, as well as discoloration due to normal light exposure. It is also known that aromatic amine scorch inhibitors used in polyurethane foam formulations further add to polyurethane discoloration and in fact significantly advance color onset. To date, strategies used to reduce discoloration have involved scorch inhibitor reformulation such as using low or no aromatic amine blends. Otherwise, polyurethane foam fabricators have few tools at their disposal, apart from mechanical shielding of foam, to prevent the color fade phenomenon.

Polyurethane foams are known to photo oxidize at wavelengths primarily below 320 nm, but degradation of foams has been observed at wavelengths as high as 410 nm.

It has now been discovered that a combination of liquid organic UV inhibitors and antioxidants, in an aqueous or organic solvent base, provides an effective composition for reducing discoloration caused by the oxidation and photooxidation of the foam.

SUMMARY OF THE INVENTION

An embodiment of the present invention relates to a composition that increases the oxidative and photooxidative stability of a polyurethane foam. The composition comprises a solvent, an antioxidant and a UV stabilizer.

Furthermore, in order to address handling and health issues arising from the use of a solvent-based composition as a topical spray, it has also been discovered that a water-based composition provides an effective treatment for treating a polyurethane foam, while also providing a composition which is stable in solution. Thus, another embodiment of the present invention relates to an aqueous emulsion that increases the oxidative and photooxidative stability of a polyurethane foam. The emulsion comprises water, an emulsifier, an antioxidant and a UV stabilizer.

Yet another embodiment of the present invention relates to a method for increasing the oxidative and photooxidative stability of a polyurethane foam by treating the foam with an emulsion according to an embodiment of the present invention.

DETAILED DESCRIPTION OF THE INVENTION

Figure 1:
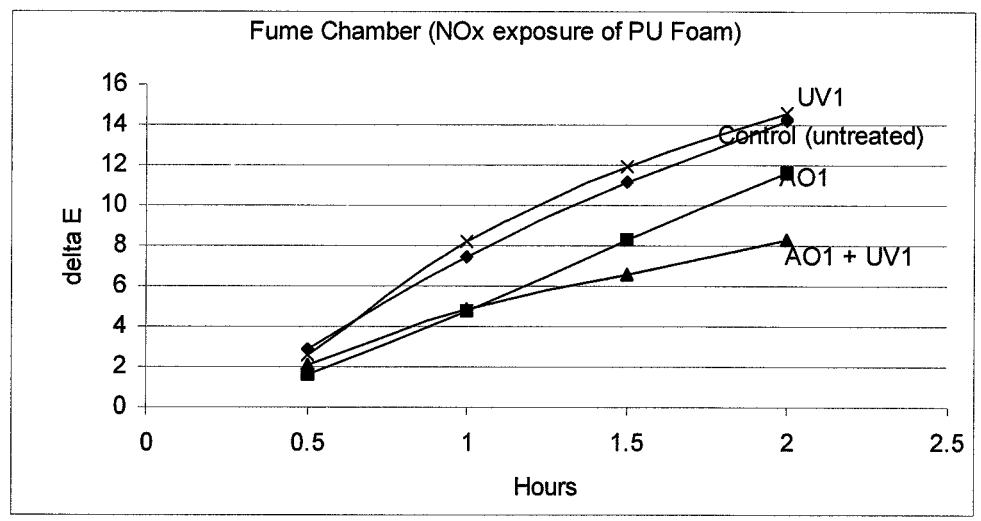
FIG. 1 is a graphical illustration showing delta E values plotted against time for formulations A-D in a fume chamber test, as presented in Table 2.
Figure 2:
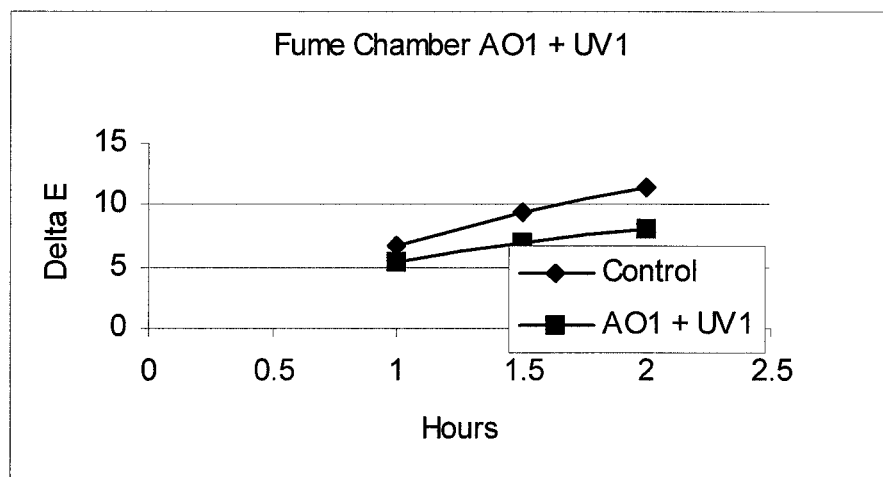
FIG. 2 is a graphical illustration showing delta E values plotted against time for formulations A and C in a fume chamber test, as presented in Table 3.

One embodiment of a polyurethane foam photooxidative inhibitor topical spray composition of the present invention comprises (1) a solvent (95-98% W/W), (2) an ultra-violet light (UV) inhibiting compound (0.1-5%), and (3) an antioxidant (0.1-5%). In addition to the form of a solvent-based composition, a more preferred composition is an aqueous emulsion comprising (1) water (95-98%), (2) an emulsifier (0.001-2%); (3) an ultra-violet (UV) light inhibiting compound (0.1-5%); and (4) a phenolic antioxidant (0.1-5%). All percentages are given as weight (or mass) % of the total composition.

The solvent is preferably an organic solvent, and more preferably is selected from, but not limited to, acetone, chloroform, ethanol, methanol, butanol, propanol, low molecular weight ketones, and the like. Generally, solvents that fully dissolve both an effective antioxidant and UV or light stabilizer are acceptable within the scope of the invention. However, practice of this aspect of the invention must also consider flammability, health and safety concerns in the production environment. Thus, solvent based anti-photo-oxidative topical formulations are generally less preferred than water based formulations, but found to be effective.

The antioxidant is selected from, but not limited to, commercially available phenolic substances such as the following preferred compounds: Alpha Tocopherol, commonly known as Vitamin E (AO1); Benzenepropanoic acid, 3,5-bis(1,1-dimethyl-ethyl)-4-hydroxy-$C_7$-$C_9$ branched alkyl esters (CAS 125643-61-0) (AO2); 2,6-Di-tertiary-butyl-nonylphenol, (AO3); 2,6-Di-tertiary-butyl-4-secbutyl-phenol (AO4); and the like. Other phenolic antioxidants, which are typically sterically hindered, may include but are not limited to, 2-tert-butylphenol, 2-tert-amylphenol, 2,6-diisopropylphenol, 4-methyl-2-tert-butylphenol, 2,4-di-tert-butylphenol, 2,4-di-tert-butyl-5-methylphenol, 2,4-di-tert-butyl-6-methylphenol, 2,6-di-tert-butyl-4-methylphenol (also called BHT), 3,4-dimethyl-6-tert-butylphenol, 3,6-di-tert-butyl-4-(2-methylbutyl)phenol, 2,4,6-tri-tert-butylphenol, 4-tert-butylcatechol, 3-tert-butylresorcinol, methylenebis(2,6-di-tert-butylphenol), 1,3,5-trimethyl-2,4,6-tris(3,5-di-tert-butyl-4-hydroxybenzyl)benzene, and 2,5-di-tert-butylhydroquinone. However, the preferred phenolics, and higher molecular weight species mentioned, tend to discolor less under test conditions versus some of the other phenolic candidates, presumably arising from less of a tendency to form dimers or aromatic conjugated systems which are highly colored. It was also observed that the "preferred" group tended to remain in solution better—that is it forms more stable emulsions- and were liquids, thus having superior blending properties. Solid phenolics tended to drop out of solution upon standing in aqueous emulsion. Thus, the preferred group showed superior performance and formulating properties.

The UV light inhibiting compound aids in retardation of the reactions responsible for photooxidation of the polyurethane foams. Suitable UV light inhibiting compounds include UV stabilizers, UV absorbers, and UV quenchers. Stabilizers relate to compounds that neutralize degradative free radical reactions, which form when light reacts with the polyurethane foam. Absorbers relate to compounds that dissipate the light as heat. Quenchers relate to compounds that dissipate the light as heat or as fluorescent or phosphorescent radiation.

Suitable UV stabilizers include hindered amine light stabilizers. The UV stabilizer is selected from, but not limited to, Bis-(2,2,6,6-tetramethyl-4-piperidyl)-sebacate; TINUVIN 213, which is a reaction product of a benzotriazole and a polyethylene glycol, and available from Ciba Chemicals (UV1); 2-(2'-Hydroxy-5'-t-octytphenyl)benzotriazole (UV2); 2,5-thiophenediylbis(5-tert-butyl-1,3-benzoxazole) (UV3); 2-(2-Hydroxy-5-methyl phenyl)benzotriazole (UV4) and the like.

Suitable benzophenone UV absorbers include, but are not limited to, 2-Hydroxy-4-n-octyloxybenzophenone, UVINUL 3008; 2-Hydroxy-4-methoxybenzophenone, UVINUL 3040; 2-Hydroxy-4-methoxy-5-sulfobenzophenone or Sulisobenzone, UVINUL MS 40; 2-(4-Benzoyl-3-hydroxyphenoxy)-2-propenoic acid ethyl ester, CYASORB UV 2098; Homopolymer of 4-(2-Acryloyloxyethoxy)-2-hydroxybenzophenone, CYASORB UV 2126; 2,2'-Dihydroxy-4-methoxybenzophenone or Dioxybenzone, CYASORB UV 24; 2-Hydroxy-4-(2-hydroxy-3-decyloxypropoxy)benzophenone and 2-Hydroxy-4-(2-hydroxy-3-octyloxypropoxy)benzophenone, MARK 1535; 2,4,4'-Trihydroxybenzophenone, MAXGARD 200; 2-Hydroxy-4-(isooctyloxy) benzophenone, MAXGARD 800; 2-Hydroxy-4-dodecyloxybenzophenone, UVINUL 410; 2,2'-Dihydroxy-4,4'-dimet-hoxy-5,5'-disulfobenzophenone, disodium salt, UVINUL 3048; 2,4-Dihydroxybenzophenone or 4-Benzoylresorcinol, UVNUL 400; 2,2'-Dihydroxy-4,4'-dimethoxybenzophenone, UVINUL D 49; 2,2',4,4'-Tetrahydroxybenzophenone, UVINUL D 50; 2,2'-Dihydroxy-4-(2-hydroxyethoxy)benzophenone, UVINUL X-19; 2-Hydroxy-4-benzyloxybenzophenone, Seesorb 105; and mixtures thereof.

Suitable triazine UVabsorbers include; 2,4,6-tris(2-hydroxy-4-octyloxyphenyl)-1,3,5-triazine; 2-(2-hydroxy-4-n-octyloxyphenyl)-4,6-bis(2,4-dimethylphenyl)-1,3,5-triazine; 2-(2-hydroxy-4-(mixed isooctyloxyphenyl)-4,6-bis(2,4-dimethylphenyl)-1,3,5-triazine; 2-(2,4-dihydroxyphenyl)-4,6-bis(2,4-dimethylphenyl)-1,3,5-triazine; 2,4-bis(2-hydroxy-4-propyloxyphenyl)-6-(2,4-dimethylphenyl)-1,3,-5-triazine; 2-(2-hydroxy-4-octyloxyphenyl)-4,6-bis(4-methylphenyl)-1,3,5-triazine; 2-(2-hydroxy-4-dodecyloxyphenyl)-4,6-bis(2,4-dimethylphenyl)-1,3,-5-triazine; 2-(2-hydroxy-4-tridecyloxyphenyl)-4,6-bis(2,4-dimethylphenyl)-1,3,5-triazine; 2-[2-hydroxy-4-(2-hydroxy-3-butyloxypropyloxy)phenyl]-4,6-bis(2,4-dimethylphenyl)-1,3,5-triazine; 2-[2-hydroxy-4-(2-hydroxy-3-octyloxypropyloxy)-phenyl]-4,6-bis(2,4-dimethylphenyl)-1, 3,5-triazine; 2-[4-dodecyloxy/ tridecyloxy-2-hydroxypropoxy)-2- hydroxyphenyl]- 4,6-bis(2,4-1-dimethylphenyl)- 1,3,5-triazine; 2-[2-hydroxy-4-(2-hydroxy-3- dodecyloxypro- poxy)phenyl]-4,6-bis(2,4-dimethylphenyl)- 1,3,5-triazine; 2-(2-hydroxy-4-hexyloxy) phenyl-4,6- diphenyl-1,3,5-triazine; 2-(2-hydroxy-4-methoxyphenyl)-4,6-diphenyl-1,3,5-triazine; 2,4,6-tris[2-hydroxy-4-(3-butoxy-2-hydroxypropoxy)phenyl]-1,3,5-triazine; 2-(2-hydroxyphenyl)-4-(4-methoxyphenyl)-6-phenyl-1,3,5-triazine.

Suitable benzoate UV absorbers include, but are not limited to, hexadecyl 3,5-di-t-butyl-4-hydroxybenzoate, CYASORB UV 2908; 3-hydroxyphenylbenzoate, SEESORB 300; ethyl-4-[[(ethylphenylamino)methylene]amino]benzoate, GIVSORB UV-1; Phenyl 2-hydroxybenzoate or phenylsalicylate, SEESORB 201; 2,4-di-t-butylphenyl-3,5-di-t-butyl-4-hydroxybenzoate, TINUVIN 120; 4-Bis(polyethoxy) amino acid polyethoxy ethyl ester, UVINUL P 25; 4-t-Butylphenyl 2-hydroxybenzoate or 4-t-butylphenylsalicylate, Seesorb 202; and mixtures thereof.

Suitable benzotriazole UV absorbers include, but are not limited to, 2-[2-hydroxy-5-(1,1,3,3-tetramethylbutyl)phenyl]benzotriazole, TINUVIN 329; 2-(2'-hydroxy-5'-(2-hydroxyethyl))benzotriazole, NORBLOC 6000; 2-(2'-hydroxy-5'-methacrylyloxyethylphenyl)-2H-benzotriazole, NORBLOC 7966; 1,1,1-tris(hydroxyphenyl)ethane benzotriazole, THPE BZT; 5-t-butyl-3-(5-chloro-2H-benzotriazol-2-yl)-4-hydroxybenzenepropanoic acid octyl ester and 3-(5-chloro-2H-benzotriazol-2-yl)-5-t-butyl-4-hydroxybenzenepropanoic acid octyl ester, TINUVIN 109; a-[3-[3-(2H-benzotriazol-2-yl)-5-t-butyl-4-hydroxyphenyl]-1-oxopropyl]-w-hydroxypoly(oxy-1,2-ethane-diyl) and a-[3-[3-(2H-benzotriazol-2-yl)-5-t-butyl-4-hydroxyphenyl]-1-oxopropyl]-w-[3-[3-(2H-benzotriazol-2-yl)-5-t-butyl-4-hydroxyphenyl]-1-oxopropoxy]poly(oxy-1,2-ethanediyl), TINUVIN 1130; 2-(2-Hydroxy-3,5-di-t-butylphenyl)benzotriazole, TINUVIN 320; 2-(2-hydroxy-3-t-butyl-5-methylphenyl)-5-chloro-2H-benzotriazole, TINUVIN 326; 2-(3'-5'-di-t-butyl-2'-hydroxyphenyl)-5-chlorobenzotriazole, TINUVIN 327; 2-(2-Hydroxy-3,5-di-t-amylphenyl)benzotriazole, TINUVIN 328; 3-(2H-Benzotriazol-2-yl)-5-t-butyl-4-hydroxybenzenepropanoic acid, TINUVIN 384; 2-(2H-benzotriazol-2-yl)-4-methyl-6-dodecyl-phenol, TINUVIN 571; 3-(2H-benzotriazol-2-yl)-5-t-butyl-4-hydroxy-1,6-hexa-nediyl ester of benzenepropanoic acid and 3-(2H-benzotriazol-2-yl)-5-t-butyl-4-hydroxy-methyl ester of benzenepropanoic acid, TINUVIN 840; 2-[2-hydroxy-3,5-bis-(1,1-dimethylbenzyl)phenyl]-2H-benzotriazole, TINUVIN 900; 2-(2H-benzotriazol-2-yl)-6-(1-methyl-1-phenylethyl)-4-(1,1,3-,3-tetramethylbutyl)phenol, TINUVIN 928; 3-(2H-benzotriazol-2-yl)-5-t-but-yl-4-hydroxybenzenepropanoic acid, $C_{7-9}$ branched and linear alkyl esters, TINUVIN 99; 2-(2-hydroxy-5-methylphenyl)benzotriazole, TINUVIN P; 2-(2'-hydroxy-3'-sec-butyl-5'-t-butylphenyl)benzotriazole, TINUVIN 350; 2-(2'-hydroxy-5'-t-butylphenyl)benzotriazole, TINUVIN PS; bis[2-hydroxy-3-(2H-benzotriazol-2-yl)-5-octylphenyl]methane, TINUVIN 360; 2-(2'-Hydroxy-5'-t-octytphenyl)benzotriazole (UV2), 2,5-thiophenediylbis(5-tert-butyl-1,3-benzoxazole) (UV3), 2-(2-Hydroxy-5-methyl phenyl)benzotriazole (UV4); and mixtures thereof.

A wide variety of ultraviolet light-absorbing compounds are available including, for example, benzophenones (e.g., materials sold under the trade names CYASORB UV-531 (available from Cytec Industries Inc., located in West Paterson, N.J.), and UVINUL 3008 (available from BASF, located in Mount Olive, N.J.)), benzotriazoles (e.g., materials sold under the trade names CYASORB UV-5411 (available from Cytec Industries Inc.), and TINUVIN 329, TINUVIN 360, and TINUVIN 571 (available from Ciba Specialty Chemicals North America, located in Tarrytown, N.Y.)), triazines (e.g., materials sold under the trade names CYASORB UV-1164 (available from Cytec Industries Inc.), and TINUVIN 400 and TINUVIN 1577 (available from Ciba Specialty Chemicals North America)), oxanilides (e.g., materials sold under the trade names TINUVIN 312 (available from Ciba Specialty Chemicals North America), and SANDUVOR VSU (available from Clariant AG, located in Muttenz, Switzerland)), benzoxazinones (e.g., CYASORB UV-3638 (available from Cytec Industries Inc.), cyanoacrylates (e.g., UVINUL 3039 (available from BASF)), and benzilidine malonates (e.g., HOSTAVIN PR-25 (available from Clariant AG).

Emulsifiers suitable for the present invention include polyoxyethylene octyl phenyl ether, other similar neutral emulsifiers can be used to establish phase homogeneity, such as ethoxylated mono-, di- and trialkylphenols (EO units: 3 to 50, alkyl: $C_4$-$C_9$), ethoxylated fatty alcohols (EO units: 3 to 50, alkyl: $C_8$-$C_{36}$) and ethoxylated oxo alcohols (EO units: 3 to 50, alkyl: $C_8$-$C_{36}$). Less preferred are anionic emulsifiers alkali metal salts and ammonium salts of alkyl sulfates (alkyl: $C_8$-$C_{12}$), of sulfuric monoesters with ethoxylated alkanols (EO units: 4 to 30, alkyl: $C_{12}$-$C_{18}$) and with ethoxylated alkylphenols (EO units: 3 to 50, alkyl: $C_4$-$C_9$), of alkylsulfonic acids (alkyl: $C_{12}$-$C_{18}$), of sulfonated fatty acids and of alkylarylsulfonic acids (alkyl: $C_9$-$C_{18}$). Up to 30 mol % of the ethylene oxide units can also be replaced by other alkylene oxide units, especially propylene oxide units.

EXAMPLES

A water based composition, containing selected commercially available antioxidants, light stabilizers and emulsifier, was topically applied to polyurethane foam using an air spray gun. The water-based compositions were sprayed onto polyurethane foam for a predetermined short length of time (e.g. 6 seconds). The resulting treated foam was placed under normal light and in a separate experiment exposed to NOx vapor generated in an enclosed fume chamber. The treated samples were quantitatively compared to untreated control specimens. In the remainder of this disclosure two examples are discussed composed of a selected antioxidant (app.0.5-1% w/w), a selected light stabilizer (app.0.5-1% w/w), a selected emulsifier (app.0.1%) and water (app.98% w/w). The composition imparts color stabilization to polyurethane foam exposed to NOx vapors (30-40% color suppression versus an untreated control, after 2 hours) and normal or ambient light (45% versus an untreated control, after 4 days, 22% after 6 days).

Preparation of Aqueous Formulations

Samples of a topical polyurethane foam photooxidative stabilizer are conveniently prepared by first treating water with an emulsifier such as TRITON X-100, though it is recognized that other emulsifiers will work. The resulting solution is next treated with TINUVIN 213 (UV1) and lastly a commercially available antioxidant such as Alpha Tocopherol (available from many commercial sources). It was observed that the composition partially separated on standing overnight but vigorous shaking restored a homogeneous and effective mixture. A second composition was prepared replacing Alpha Tocopherol with Benzenepropanoic acid, 3,5-bis(1,1-dimethyl-ethyl)-4-hydroxy-$C_7$-$C_9$ branched alkyl esters (CAS 125643-61-0), at the same loading level. This composition did not separate upon standing.

Preparation of Polyurethane Foam

1. Draw 0.37 cc Dabco T9 Tin Catalyst into a 1 cc syringe, place syringe into can under mixing hood.
2. Weigh 141.6 grams TDI into a 4 oz. jar under hood. (For weight adjustment purposes, one full dropper=approximately 3 grams, one drop TDI=0.03 grams).
3. Make up a cake box—label—place under hood. Set timer in hood for 1½ minutes—switch off.
4. To measure cream and rise time—make sure LabChron Timer is ON and reset to zero.
5. Weigh 200 grams of polyol a R24 cold drink cup.
6. Weigh 1.00 gram of scorch inhibitor (VANOX® 945) into polyol
7. Add 11.0 grams distilled water.
8. Add 2.40 grams silicone L5770.
9. Add 0.94 grams A127 amine catalyst.
10. Add 14.0 grams fyrol FR2 flame retardant.
11. Place cup under mixer in hood-swing table underneath cup. And put on gloves.
12. Place left foot on floor pedal and push down.
13. Loosen cap on jar of TDI.
14. Grasp cup and turn on timer.
15. Mix for 60 seconds.
16. Release floor switch at the 30 second remaining mark to stop mixer for 15 seconds.
17. Grasp the syringe of tin catalyst, place into top of mixing cup—ready to squeeze. At the 15 seconds remaining mark, restart mixer and empty syringe at same time.
18. At the 5 second mark—stop timer—and add TDI from 4 oz. jar quickly.
19. Restart mixer for the last 5 seconds.
20. When the timer and mixer stop—quickly swing table from under cup, remove from mixer and pour into cake box.
21. Let rise completely (till bubbles appear at surface) Stop lab chron timer when bubbles appear. Record cream and rise times on box. Cream time—from addition of TDI until foam starts to rise (timer time+5 seconds). Rise time—from addition of TDI till foam stops rising (timer time+5 seconds).
22. Remove cake box from hood and place into microwave—setting at 8:30 to 10:30-40% power setting depending on room conditions—cover hood opening over precision scientific oven to increase suction from microwave.
23. At the end of the microwave cycle, remove from microwave and place into Precision Scientific oven for 2 minutes at 250° F.
24. Remove foam from oven and start a timer set for 15 minutes.
25. Place Omega temperature probe into center of foam to measure peak exotherm—about 3 minutes from time of insertion of probe.
26. Record temperature on foam box and experiment sheet. Remove probe and set foam aside to wait for 15 minute timer.
27. Repeat above steps for each foam to be made.

After the foam bun is cooled, a "slice" parallel to the table surface, is removed from the bun. Swatch "circles" are cut from the unscorched portion of the slice having a diameter of approximately 2 inches and a thickness of approximately 0.5 inches.

Spraying the Aqueous Formulation onto Polyurethane Foam Swatches

Each composition was loaded into a spray gun (Compressor No. PC410, Federal Equipment Co., available through W.R. Brown, North Chicago, Ill., "Speedy Sprayer," and No.HS811 Hobby Gun), which was mounted to assure a reproducible treatment-pattern and loading. The spray fixture was directed toward a target site where the foam swatch is positioned, at a distance of about 5 inches. The spray nozzle and reservoir are fixed in place with a clock or suitable timing device that powers the attached pump for a predetermined length of time. With the foam positioned, the pump is activated, by the clock, for about 5 seconds. The composition is sprayed onto the foam surface for that length of time.

Exposure of Polyurethane Foam Swatches

Fume Chamber Study; Justification for Test and Method

The fume chamber test simulates warehouse storage conditions and thus how polyurethane foam might "age" under storage. Each treated foam swatch, and corresponding untreated control, was placed into a "fume chamber." The equipment is available from:

United States Testing Co.
Inc. Hoboken, N.J.
Atmospheric Fume Chamber
Model 8727, Serial number 13411, 230 Volt, 50 Cycle, 1 Phase.

Once the Bunsen burner at the base of the chamber is ignited the chamber is allowed to come to temperature (140 F), the swatches are then positioned upon a motor driven rotating carousel within the chamber. The carousel is next activated and the sample specimens are exposed to the NOx enriched environment for a predetermined interval. The samples are next removed at ½ hour intervals and color is quantitatively measured.

Light Exposure Studies; Justification for Test and Method

Light exposure tests, that simply require positioning a foam swatch 8 inches beneath a standard 32 W light bulb, simulate polyurethane foam exposure to warehouse lighting. The swatches, treated and untreated, are placed under the light and are allowed to sit until sampling at intervals; generally every few days. Color fade usually manifests itself within hours of exposure.

Quantitative Treatment of Data

The L.a.b. values, from the Hunter L.a.b. scale, measured using a Technidyne Corp. Brightimeter Micro S4-M, quantifies color developed in a sample. The L.a.b. scale, assigns to each variable (lightness (L), a, b) a corresponding dimension (x, y, z). L.a.b. readings taken from a specimen, represent color deviation from a white plaque standard. In practice, L.a.b. readings are first acquired for a starting swatch of foam (treated or untreated) and over time additional L.a.b. values are collected. Thus, the initial L, a, b readings are (1) $L_1$, $a_1$, $b_1$, where the subscript represents the initial measurement (time 1) and the same specimen (2) $L_2$, $a_2$, $b_2$, where the subscript represents the measurement at a later time (time 2), is collected at a later time during the exposure period. The values are treated using the equation presented to generate a delta ($\Delta$) E value.

$$\Delta E = \sqrt{(L_1-L_2)^2 + (a_1-a_2)^2 + (b_1-b_2)^2}$$

A large $\Delta$ E typically reflects a numerically large deviation from the starting white polyurethane foam specimen. Conversely, a small $\Delta$ E (dE) reflects a numerically small deviation from the starting white polyurethane foam specimen. Relatively smaller delta E values are preferred. Thus, delta E can be a measure of "color drift" where a large value represents significant color drift while a small value represents less significant color drift from the original sample.

Method

Swatches were placed into a standard clear plastic holder for reproducible positioning of the specimens. The holder was made up of a separable male and female tray, between which the sample is positioned. The holder with sample loaded is next placed over the scanning eye of the Brightimeter. A weight bearing down on the sample "sandwich" provides a constant compressive force throughout data acquisition. It was determined that this method gave the most reproducible numbers for a particular specimen.

Discussion of Results

Table 2 shows dE values for compositions sprayed on polyurethane foam specimens. Formulation A is the untreated control; Formulation B contains water an emulsifier, and AO1. Formulation D contains water, an emulsifier, and UV1. And Formulation C contains water, AO1, UV1 and an emulsifier. The specimens were next placed into an atmospheric fume chamber and exposed to NOx fumes. Inspection of the table reveals that Formulations B and C, which contain AO1 outperformed the control but Formulation C showed the least color drift (lowest dE) among all of the compositions. It appears that while UV1 has no effect on color fade (Formulation D), and AO1 reduces color fade, (Formulation B), it is the combination of both AO1 and UV1 that leads to a surprising synergy in suppressing color fade of polyurethane foam due to NOx exposure. FIG. 1 graphically depicts the tables contents. A 42% suppression of color is observed after 2 hours exposure of the foam specimen in the fume chamber.

TABLE 1

| Formulation | Formula A | Formula B | Formula C | Formula D |
|---|---|---|---|---|
| AO1 | 0 | 0.99 | 0.95 | 0 |
| Trit X-100 | 0 | 0.10 | 0.11 | 0.10 |
| Water | 0 | 98.91 | 97.93 | 98.91 |
| UV1 | 0 | 0 | 1.01 | 0.99 |

*values shown are in percent by weight

TABLE 2

| | dE | | | |
|---|---|---|---|---|
| Time (hours) | Formula A | Formula B | Formula C | Formula D |
| 0.5 | 2.88 | 1.59 | 2.10 | 2.61 |
| 1.0 | 7.42 | 4.77 | 4.89 | 8.15 |
| 1.5 | 11.18 | 8.24 | 6.60 | 11.88 |
| 2.0 | 14.23 | 11.66 | 8.28 | 14.58 |

Formulation C was tested in a repeat experiment against a control yielding the values shown in Table 3. In this experiment, a 30% suppression of color fade was observed after 2 hours exposure of a foam specimen in the fume chamber.

TABLE 3

| | dE | |
|---|---|---|
| Time (hours) | Formula A | Formula C |
| 1.0 | 6.65 | 5.29 |
| 1.5 | 9.33 | 6.87 |
| 2.0 | 11.42 | 8.04 |

Thus, Formula C suppresses color fade about 30-40% versus Formula A (control) specimens exposed to NOx fumes.

Figure 3:
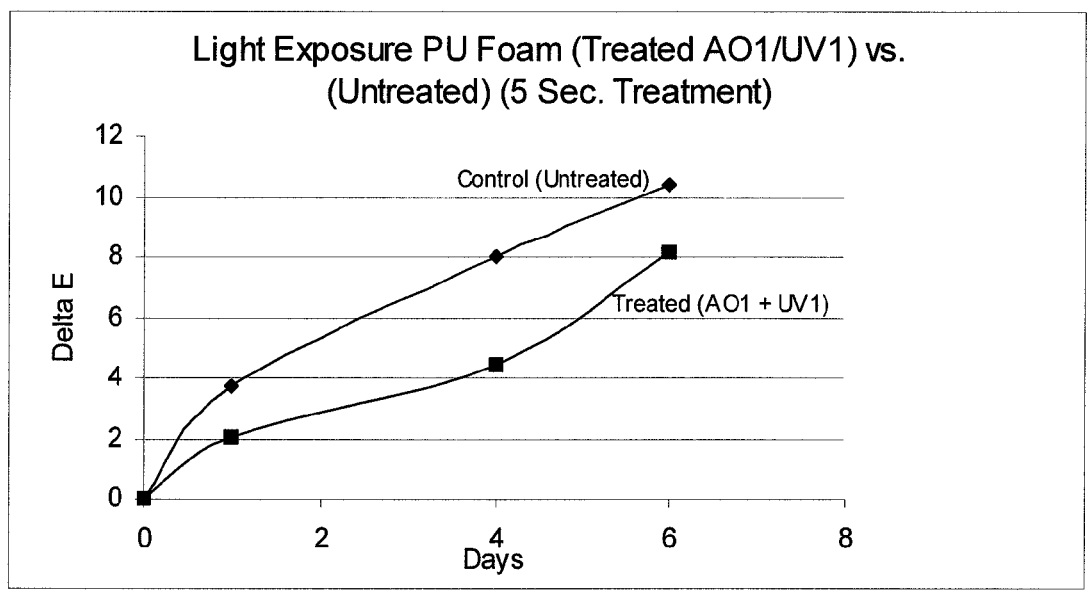
FIG. 3 is a graphical illustration showing delta E values plotted against time for formulations A and C in a light exposure test, as presented in Table 4.

Table 4 presents results from color fade of polyurethane foam specimens placed in normal light. After four days, a treated (Formulation C) polyurethane foam specimen yields a dE of 4.4, while the untreated specimen dE value is 8. The treated specimen fades about 45% less after 4 days. After 6 days the treated and untreated specimens differ by 22%. FIG. 3 depicts the data.

TABLE 4

| Time (days) | dE | |
|---|---|---|
| | Formula A | Formula C |
| 1 | 3.73 | 2.02 |
| 4 | 8.03 | 4.41 |
| 6 | 10.41 | 8.13 |

CONCLUSIONS

A water based composition containing selected commercially available antioxidants and light stabilizers was topically applied to polyurethane foam using an air spray gun. The exemplified composition was a blend of a selected antioxidant (app.0.5-1% w/w), a selected light stabilizer (app.0.5-1% w/w), a selected emulsifier (app.0.1%) and water (app.98% w/w). The aqueous composition specifically utilizes AO1 (1%), UV1(1%), TRITON X-100 (0.1%), which imparts color stabilization to polyurethane foam exposed to NOx vapors (30-40% color suppression after 2 hours) and normal light (45% after 4 days, 22% after 6 days).

Figure 4:
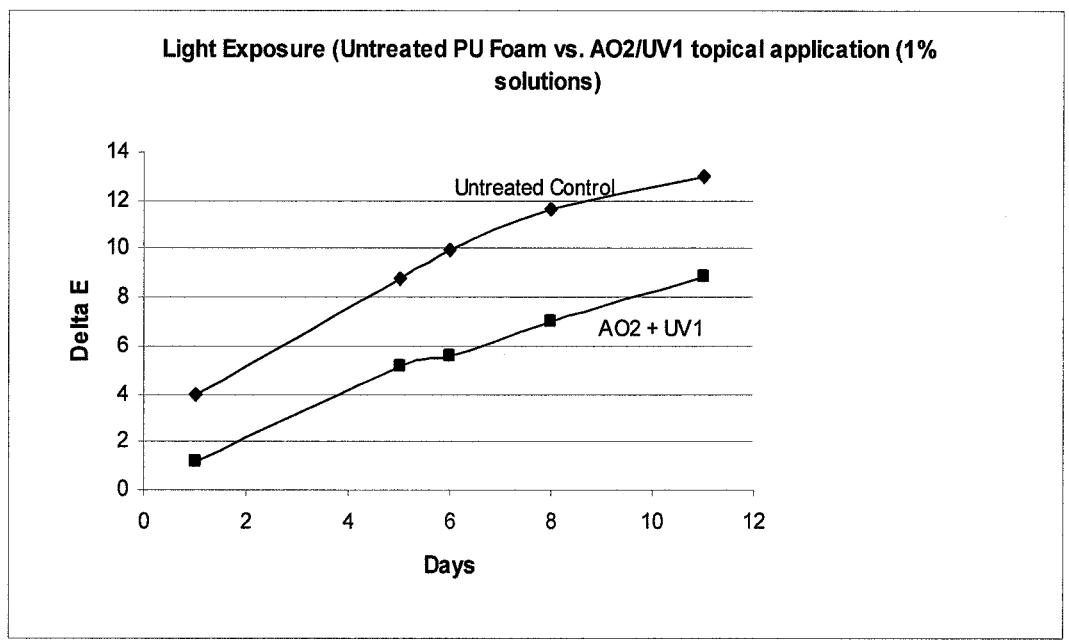
FIG. 4 is a graphical illustration showing delta E values plotted against time for formulations A and F in a light exposure test, as presented in Table 5.
Figure 5:
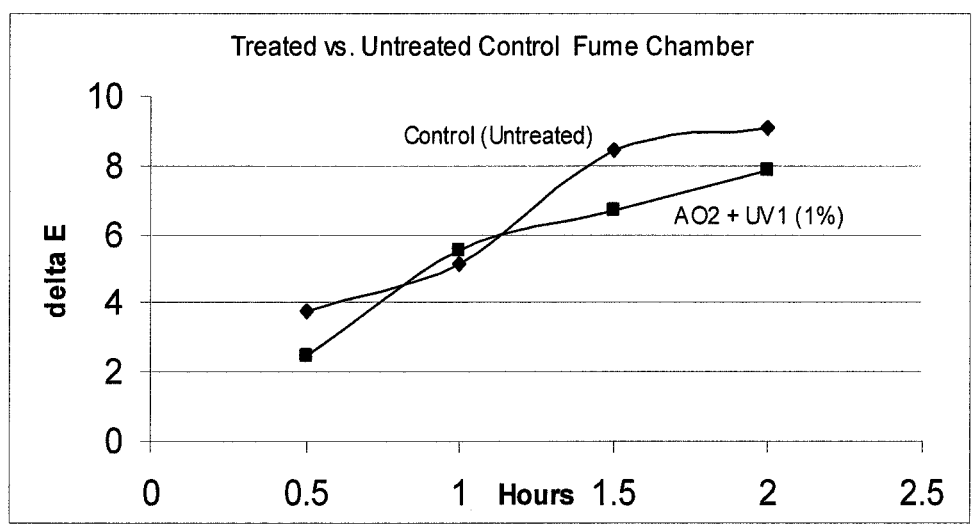
FIG. 5 is a graphical illustration showing delta E values plotted against time for formulations A and F in a fume chamber test, as presented in Table 6.

A second system is demonstrated to support the invention. Formula E contains and AO3/UV1 and Formula F contains AO2/UV1. Both Formula E and Formula F are similar to the emulsion Formula C above, except that the antioxidant and UV inhibitor in each are each present at about 0.5 wt %. The emulsifier is present at about 0.1%, as shown in Formula C, with water making up the difference. Both Formulas E and F are according to the present invention. Table 5 below shows ΔE values of a three samples of a polyurethane foam in a light exposure test. One foam sample was untreated (Formula A), while the other two were treated with Formula E and Formula F, respectively. Table 6 below shows the ΔE values of the same three samples in the fume chamber tests. FIGS. 4 and 5 show this data in graphical form.

TABLE 5

| Time (days) | dE | | |
|---|---|---|---|
| | Formula A | Formula E | Formula F |
| 1 | 3.96 | 3.13 | 1.19 |
| 5 | 8.81 | 4.88 | 5.12 |
| 6 | 9.94 | 5.35 | 5.58 |
| 8 | 11.68 | 6.55 | 7.03 |
| 11 | 13.01 | 7.59 | 8.83 |

TABLE 6

| Time (hours) | dE | | |
|---|---|---|---|
| | Formula A | Formula E | Formula F |
| 0.5 | 3.76 | 5.50 | 2.50 |
| 1.0 | 5.14 | 10.35 | 5.54 |
| 1.5 | 8.44 | 11.32 | 6.69 |
| 2.0 | 9.12 | 11.97 | 7.88 |

All AO/UV combinations showed some measure of protection in the fume chamber and/or in light exposure studies. It is noted that while the fume chamber results for Formula E were not as favorable when compared with Formula A (control), Formula E performed quite favorably versus Formula A in the light exposure tests. On the other hand Formula F performed better than Formula A in fume (dE=6.69, 1.5 hrs) and light studies (dE=8.83, 11 days). Thus, this represents a preferred composition.

Figure 6:
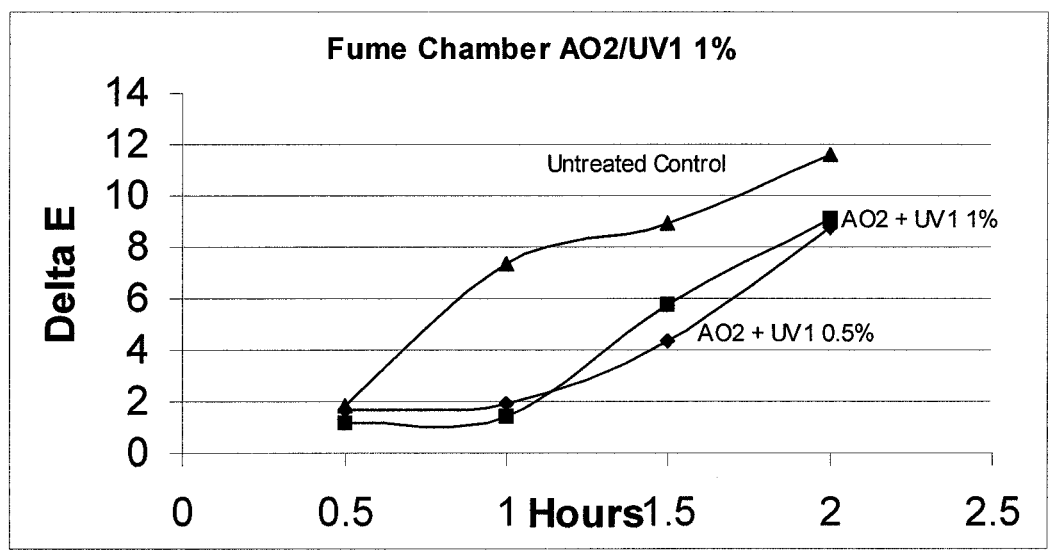
FIG. 6 is a graphical illustration showing delta E values plotted against time for formulations A, F and G in a fume chamber test, as presented in Table 7.
Figure 7:
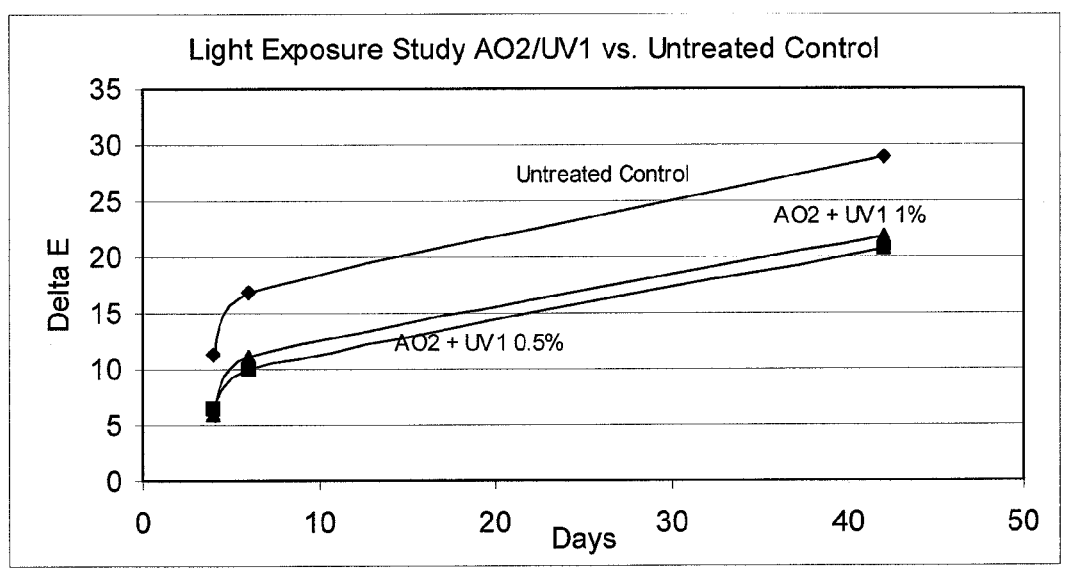
FIG. 7 is a graphical illustration showing delta E values plotted against time for formulations A, F and G in a light exposure test, as presented in Table 8.

Another experiment was conducted to measure the effect of different concentrations of UV inhibitors and antioxidants in the composition of the invention. Formula F was compared against Formula G, Formula H and Formula I. Formula G contains the same components as Formula F, except both UV1 and AO2 were present in an amount of 1 wt. % each (vs. 0.5 wt. % in Formula F). Formula F and G are compositions of the present invention. Formula H contains UV1 in a concentration of 1 wt. %, an emulsifier of 0.1 wt. %, with water comprising the remainder. Formula G contains AO1 in a concentration of 1 wt. %, an emulsifier of 0.1 wt. %, with water comprising the remainder. Formulas G and I are outside the scope of the present invention. Table 7 shows the ΔE values of a five samples of a polyurethane foam, Formula A which was untreated (Control) and four that were treated with Formula F, Formula G, Formula H and Formula I. Table 8 below shows the ΔE values of Formula A, Formula F, Formula G and Formula H in the fume chamber tests. FIGS. 6 and 7 show the data in graphical form.

TABLE 7

| Time (hrs) | dE | | | | |
|---|---|---|---|---|---|
| | Control | Formula F | Formula G | Formula H | Formula I |
| 0.5 | 1.81 | 1.67 | 1.16 | 6.09 | 4.11 |
| 1.0 | 7.30 | 1.88 | 1.40 | 3.92 | 2.11 |
| 1.5 | 8.89 | 4.35 | 5.74 | 7.57 | 7.21 |
| 2.0 | 11.59 | 8.71 | 9.07 | 8.28 | 10.10 |

TABLE 8

| Time (days) | dE | | | |
|---|---|---|---|---|
| | Control | Formula F | Formula G | Formula H |
| 4 | 14.68 | 7.92 | 9.11 | 7.61 |
| 6 | 16.76 | 10.05 | 11.14 | 10.31 |
| 43 | 28.82 | 20.67 | 21.82 | 20.89 |

From the data above, it is seen that there are consistent results for both a 1% concentration of each component (AO and UV inhibitor) and a 0.5% concentration of each component, as seen in Table 7 (compare fume chamber results 1% vs. 0.5% dE=9.07 vs. 8.71, 2 hours and light studies dE=11.14 vs. 10.05, 6 days.). Both combinations clearly provide protection against color drift arising from polyurethane foam exposure to NOx fumes (dE=11.59) or light exposure (dE=16.76). It is also worth mentioning that to the observer, a 2-3 difference in dE is significant. Thus, foams juxtaposed, one treated, one not treated, in the cases cited show a clear difference to the eye and quantitatively as demonstrated.

Table 7 and FIG. 6 show another interesting and surprising feature of the invention. Firstly at 1.5 hours of exposure in the fume chamber, foams treated with either AO2 or UV1 alone (dE=7.21, 7.57) show a marked contrast with the combination (for 0.5% combination dE=4.35, for 1% combination dE=5.74). It is also worth pointing out that in the case of the 0.5% combination that 0.5% of AO2 and 0.5 g of UV1 are present in the solution giving a total solids level of 1%. Thus, it appears that up to about 1.5 hours exposure in the fume chamber the combination exhibits a true synergy. The blend compared with the UV inhibitor does exhibit synergistic behavior up to 1.5 hours (See Table 7).

Thus, the second example shows that a combination of a selected AO and a UV inhibitor reduce color drift of polyurethane foam exposed to NOx fumes and normal light. Though components of the invention were found to effectively stabilize color drift of polyurethane foam exposed to normal light, the composition is preferred because it provided adequate protection over the 1.5 hour fume chamber exposure period. Further, as discussed, a true synergy was observed with AO2 and UV1 blend vs. each component alone exposed to NOx fumes generated in the fume chamber.

The invention claimed is:

1. A method for increasing the oxidative and photooxidative stability of a polyurethane foam with respect to exposure to NOx vapors and natural light, comprising the steps of:
Preparing an emulsion consisting of:
   An emulsifier at about 0.001-2 wt %;
   Water in an amount of at least 97 wt %;
   An ultraviolet (UV) light inhibiting compound at about 0.5-1 wt %; and
   A phenolic antioxidant at about 0.5-1 wt %; and
spraying onto a surface of the polyurethane foam a composition consisting of the emulsion.

2. The method of claim 1, wherein the antioxidant is selected from Alpha Tocopherol; Benzopropanoic Acid, 3-5-bis(1,1-dimethyl-ethyl)-4-hydroxy-C7-C9 branched alkyl esters; 2-6-Ditertiary-butyl nonylphenol; and 2-6-Ditertiary-butyl-4-secbutyl-phenol.

3. The method of claim 1, wherein the emulsifier is selected from polyoxyethylene octyl phenyl ether, ethoxylated mono-, di- and trialkylphenols, ethoxylated fatty alcohols and ethoxylated oxo alcohols.

4. The method of claim 2, wherein the antioxidant comprises Alpha Tocopherol.

5. The method of claim 1, wherein the UV light inhibiting compound comprises a reaction product of a benzotriazole and a polyethylene glycol.

6. The method of claim 1, wherein the (UV) light inhibiting compound comprises a reaction product of a benzotriazole and a polyethylene glycol, and the phenolic antioxidant comprises one of alpha tocopherol; benzopropanoic acid, 3-5-bis (1,1-dimethyl-ethyl)-4-hydroxy-C7-C9 branched alkyl esters; and 2-6-ditertiary-butyl nonylphenol.

7. The method of claim 1, wherein the emulsifier is present in amount of at least 0.1 wt %.

8. The method of claim 7, wherein the UV light inhibiting compound and the antioxidant are each present at about 1.0 wt %.

* * * * *